United States Patent
Ozaki et al.

(10) Patent No.: US 8,014,090 B2
(45) Date of Patent: Sep. 6, 2011

(54) LENS DEVICE

(75) Inventors: Takao Ozaki, Saitama (JP); Koichi Nagata, Saitama (JP); Katsumi Saito, Saitama (JP); Satoru Nemoto, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 76 days.

(21) Appl. No.: 12/541,692

(22) Filed: Aug. 14, 2009

(65) Prior Publication Data

US 2010/0067129 A1 Mar. 18, 2010

(30) Foreign Application Priority Data

Sep. 12, 2008 (JP) ................................ P2008-235285

(51) Int. Cl.
*G02B 7/02* (2006.01)
(52) U.S. Cl. ........................ 359/823; 359/819
(58) Field of Classification Search .................. 359/819, 359/822, 694, 696, 811, 823–827
See application file for complete search history.

(56) References Cited

U.S. PATENT DOCUMENTS

| 5,225,941 A * | 7/1993 | Saito et al. ..................... 359/824 |
| 2007/0081808 A1 | 4/2007 | Senba |
| 2009/0273701 A1 * | 11/2009 | Senba ........................... 348/340 |

FOREIGN PATENT DOCUMENTS

JP 2005-114811 A 4/2005

OTHER PUBLICATIONS

Chinese Office Action dated Jan. 26, 2011 issued in corresponding Japanese patent application No. 2011012100499170 (with English translation).

* cited by examiner

*Primary Examiner* — Scott J Sugarman
*Assistant Examiner* — Mahidere S Sahle
(74) *Attorney, Agent, or Firm* — Birch, Stewart, Kolasch & Birch, LLP (57) ABSTRACT

A lens device includes: a lens barrel body having holes; guide bars supported by the lens barrel body and one ends of the guide bars are inserted in the holes; lens holding frames supported so as to be movable along the guide bars and are engaged with the guide bars; and pressing members that press the one ends of the guide bars in a direction perpendicular to the guide bars and are inserted in the holes. The pressing members have a falling-off prevention engagement protrusion engaged with the lens barrel body.

6 Claims, 9 Drawing Sheets

LENS DEVICE

The present application claims priority from Japanese Patent Application No. 2008-235285 filed on Sep. 12, 2008, the entire content of which is incorporated herein by reference.

BACKGROUND OF INVENTION

1. Field of the Invention

The present invention relates to a lens device, and more particularly, to a lens device provided in a portable image taking apparatus.

2. Description of the Related Art

A lens device is provided with a plurality of taking lenses that move in the direction of the optical axis, such as a focus lens and a zoom lens (see, for example, JP-A-2005-114811). In such moving-type taking lenses, normally, the holding frame thereof is engaged with two guide bars, one guide bar acts as a main guide in the direction of the optical axis, and the other guide bar acts as a detent for the lens holding frame. That is, the lens holding frame is provided with: a guide portion slidably engaged with the guide bar as the main guide; and a detent portion engaged with the guide bar as the detent to restrict the movement in the rotation direction. The guide portion has a predetermined length in the axial direction in order to prevent the lens holding frame from rattling, and by the guide portion sliding on the guide bar, the lens holding frame is moved in the direction of the optical axis.

When a plurality of moving-type taking lenses are provided, the guide bars are made common to the lens holding frames of the taking lenses. For example, in a lens device having a zoom lens and a focus lens, the guide portion of the zoom lens side and the guide portion of the focus lens side are engaged with the guide bar as the main guide, and the detent portion of the zoom lens side and the detent portion of the focus lens side are engaged with the guide bar as the detent. Thereby, common guide bars can be used among a plurality of taking lenses, so that the number of parts can be reduced to thereby reduce cost.

However, when the guide bars are made common to a plurality of taking lenses, the size of the lens device cannot be reduced. That is, since it is necessary for the guide portions to have a predetermined length in the axial direction, if a plurality of guide portions are engaged with one guide bar, a large space is required in the axial direction, so that the size of the lens device is increased in the axial direction.

Therefore, a method is considered in which a plurality of guide portions are disposed so as to be divided between two guide bars. For example, the guide portion of the zoom lens side is engaged with a first guide bar so as to act as the main guide of the zoom lens size, whereas the guide portion of the focus lens side is engaged with a second guide bar to act as the main guide of the focus lens size. In that case, the detent portion of the focus lens side is engaged with the first guide bar, and the detent portion of the zoom lens side is engaged with the second guide bar. Thereby, the two guide portions are disposed so as to be divided between the two guide bars, so that the size of the lens device can be reduced.

However, in the above-described case, since the two guide bars each act as a main guide, it is necessary to attach the two guide bars so as to be parallel to the optical axis with high accuracy, and the assembly work requires a great deal of labor.

Moreover, it is desirable that the guide bars be parts selected according to the processing accuracy of the guide holes of the guide bars or selected for each rod of the guide bars or the guide portions. However, when both of the two guide bars are the main guides, in order to maintain high parallelism with the optical axis, it is necessary to change the design every time the guide bars are changed, so that the guide bars cannot be selected parts.

As a method for solving such a problem, a method is considered in which a plurality of attachment holes larger than one ends of the guide bars are provided on the lens barrel body, the one ends of the guide bars are inserted in the attachment holes and pressing members are press-fitted in the clearances between the one ends and the attachment holes. In that case, by pressing the one ends of all the guide bars in the same direction by the pressing members, all the guide bars can be fitted in the lens device with high parallelism. Moreover, even guide bars having different diameters can be fixed to the lens barrel body, so that the guide bars can be selected parts.

However, in such a method, a problem occurs in that the pressing member readily falls off from the lens barrel body. Since the guide bar moves or falls off if the pressing member falls off, the guide bar cannot be used as the main guide.

SUMMARY OF INVENTION

The present invention is made in view of such circumstances, and an object thereof is to provide a lens device having a structure suitable for guiding the lens holding frame by a plurality of guide bars.

(1) According to an aspect of the invention, a lens device includes: a lens barrel body that has a plurality of attachment holes; a plurality of guide bars that are supported by the lens barrel body by one ends thereof being inserted in the plurality of attachment holes, respectively; a plurality of lens holding frames that are supported so as to be movable along the plurality of guide bars by being engaged with the guide bars; and a plurality of pressing members that press the one ends of the guide bars in a direction perpendicular to the guide bars, by being inserted in the attachment holes, wherein each of the plurality of the pressing members includes: a wall surface that restricts a movement, in an axial direction, of the guide bars; and an engagement portion that is engaged with the lens barrel body to prevent falling off from the lens barrel body.

According to (1), since the pressing members are provided with the engagement portion engaged with the attachment hole of the lens barrel body, the pressing members can be prevented from falling off from the lens barrel body.

Moreover, according to (1), since the pressing members have the wall surface that restricts a movement, in an axial direction, of the guide bars, the guide bars can be prevented from falling off from the attachment holes by the pressing members.

Further, according to (1), since the lens device is structured so that one ends of the guide bars are inserted in the attachment holes larger than to be attached, even guide bars having different diameters can be fixed to the lens barrel body. Consequently, the guide bars can be selected parts.

(2) In the lens device of (1), the plurality of pressing members press the plurality of the guide bars in a same direction, respectively.

According to (2), since the guide bars are all pressed in the same direction by the pressing members, the plurality of guide bars can be fitted in the lens device with high parallelism. Consequently, the plurality of guide bars can be used as the main guides of the lens holding frames, so that the size of the lens device can be reduced.

(3) In the lens device of (1), each of the pressing members is made of an elastic material, and has a hollow portion adjacent to the engagement portion.

According to (3), since the hollow portion is formed near the engagement portion, the engagement portion can be engaged with the lens barrel body while the pressing member is elastically deformed. Moreover, according to the present invention, since the hollow portion is formed in the pressing member, the guide bar inside can be visually recognized through the hollow portion of the pressing member.

(4) In the lens device of (1), the attachment holes are square holes, wherein the wall surface includes a substantially rectangular body that is fitted in the attachment hole, and the engagement portion protrudes from an outer surface of the rectangular body, and wherein the pressing members further include a press fitting portion that protrudes from the rectangular body in a substantially triangular tube shape and press-fitted in a clearance between the attachment hole and the guide bar.

According to (4), the rectangular body can be prevented from falling off from the attachment hole by the engagement portion. Moreover, the guide bar can be fixed by being pressed against a corner of the attachment hole by the triangular press fitting portion.

(5) In the lens device of (1), the plurality of the lens holding frames include first and second lens holding frames, wherein the first lens holding frame includes: a first guide portion that is engaged with a first guide bar so as to be slidable in a direction of an optical axis; and a detent portion that is engaged with a second guide bar to restrict a movement in a rotation direction of the first guide portion, and wherein the second lens holding frame includes the second portion which is engaged with the second guide bar.

According to (5), a plurality of lens holding frames use different guide bars as main guides. The present invention is particularly effective when a plurality of guide bars are used as main guides.

(6) The lens device according to claim 1, wherein the lens barrel body includes a press fitting opening for being press-fitted another end of the guide bar, and thickness of side surfaces of the press fitting opening to be pressed by the pressing member are larger than that of opposite sides of the side surfaces.

According to (6), since the wall surfaces of the press fitting opening is thick on the pressed sides and thin on the opposite sides, when the other end of the guide bar is press-fitted, the wall surfaces on the pressed sides are not deformed and the wall surfaces on the opposite sides are deformed. Consequently, the guide bar can be fixed while being accurately positioned with reference to the wall surfaces on the pressed sides, and the guide bar can be fixed parallel to the optical axis.

Since the pressing members are provided with the engagement portions engaged with the attachment holes of the lens barrel body from the inside, the pressing members can be prevented from falling off to the outside of the lens barrel body. Moreover, according to the present invention, since the ends of the guide bars are fixed by being pressed all in the same direction by the pressing members, the plurality of guide bars can be fitted in the lens device with high parallelism and the plurality of guide bars can be each used as a main guide, so that the size of the lens device can be reduced.

DESCRIPTION OF EXEMPLARY EMBODIMENTS

Hereinafter, an exemplary embodiment of a lens device according to the present invention will be described in detail with reference to the attached drawings.

Figure 1:
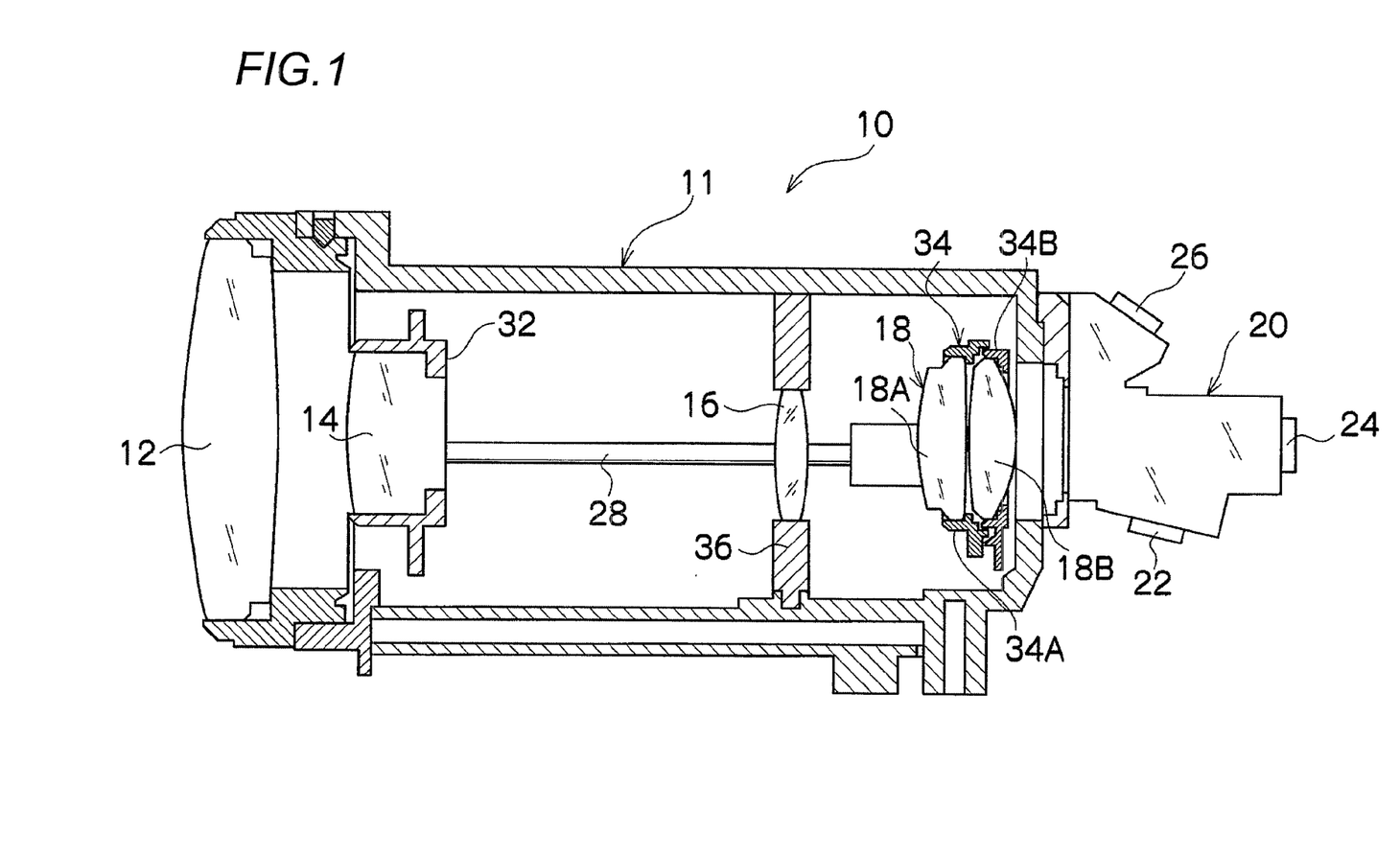
FIG. 1 is a side cross-sectional view showing a lens device according to an exemplary embodiment.

FIG. 1 shows a side cross-sectional view of a lens device 10 according to the exemplary embodiment. The lens device 10 includes, from the front side of the taking optical axis (subject side) to the rear side of the taking optical axis (imaging side), a first lens unit 12, a second lens unit 14, a third lens unit 16 and a fourth lens unit 18. The subject light having passed through the first to fourth lens units 12 to 18 is imaged at image sensors 22, 24 and 26 provided at the R, G and B exit ends of a color separation prism 20 constituting a color separation optical system, through the color separation prism 20. The camera body (not shown) where the lens device 10 is mounted is provided with a signal processing circuit (not shown) that performs necessary processings (white balance, γ correction, etc.) on the imaging signals obtained from the image sensors 22, 24 and 26 to generate a video signal of a predetermined format.

The first lens unit 12 is a so-called front lens. The second lens unit 14 is a variator lens that changes the focal length. The third lens unit 16 is a relay lens. The fourth lens unit 18 is a focus lens that adjusts focus.

The first to fourth lens units 12 to 18 are held in a lens barrel body 11. In the lens barrel body 11, a pair of guide bars 28 and 30 (see FIG. 2) parallel to the optical axis are inserted, and a holding frame 32 of the second lens unit 14 and a holding frame 34 of the fourth lens unit 18 are slidably supported by the guide bars 28 and 30.

The holding frame 32 of the second lens unit 14 is provided with a nut (not shown) constituting a screwer, and into this nut, a feed screw (not shown) also constituting a screwer is screwed. This feed screw is disposed parallel to the optical axis, and has its end coupled to the output shaft of a stepping motor for zooming (not shown). When a zoom signal is outputted from the camera body side to the zoom driver circuit (not shown) of the stepping motor for zooming, the stepping motor for zooming rotates the feed screw in the direction corresponding to the signal. Thereby, the second lens unit 14 is moved backward or forward in the direction of the optical axis along the guide bars 28 and 30, thereby adjusting the focal length to a desired one.

The holding frame 34 of the fourth lens unit 18 is similarly provided with a nut (not shown) constituting a screwer, and into this nut, a feed screw (not shown) also constituting a screwer is screwed. This feed screw is disposed parallel to the optical axis, and has its end coupled to the output shaft of a stepping motor for focusing (not shown). When a focus signal is outputted from the camera body side to the focus driver circuit (not shown) of the stepping motor for focusing, the stepping motor for focusing rotates the feed screw in the direction corresponding to the signal. Thereby, the fourth lens unit 18 is moved backward or forward in the direction of the optical axis along the guide bars 28 and 30, thereby adjusting the focus.

On the other hand, the third lens unit 16 is fixed to the lens barrel body 11. That is, the third lens unit 16 is held by a lens holding frame 36, and the lens holding frame 36 is fitted in the lens barrel body 11 to be fixed.

Figure 2:
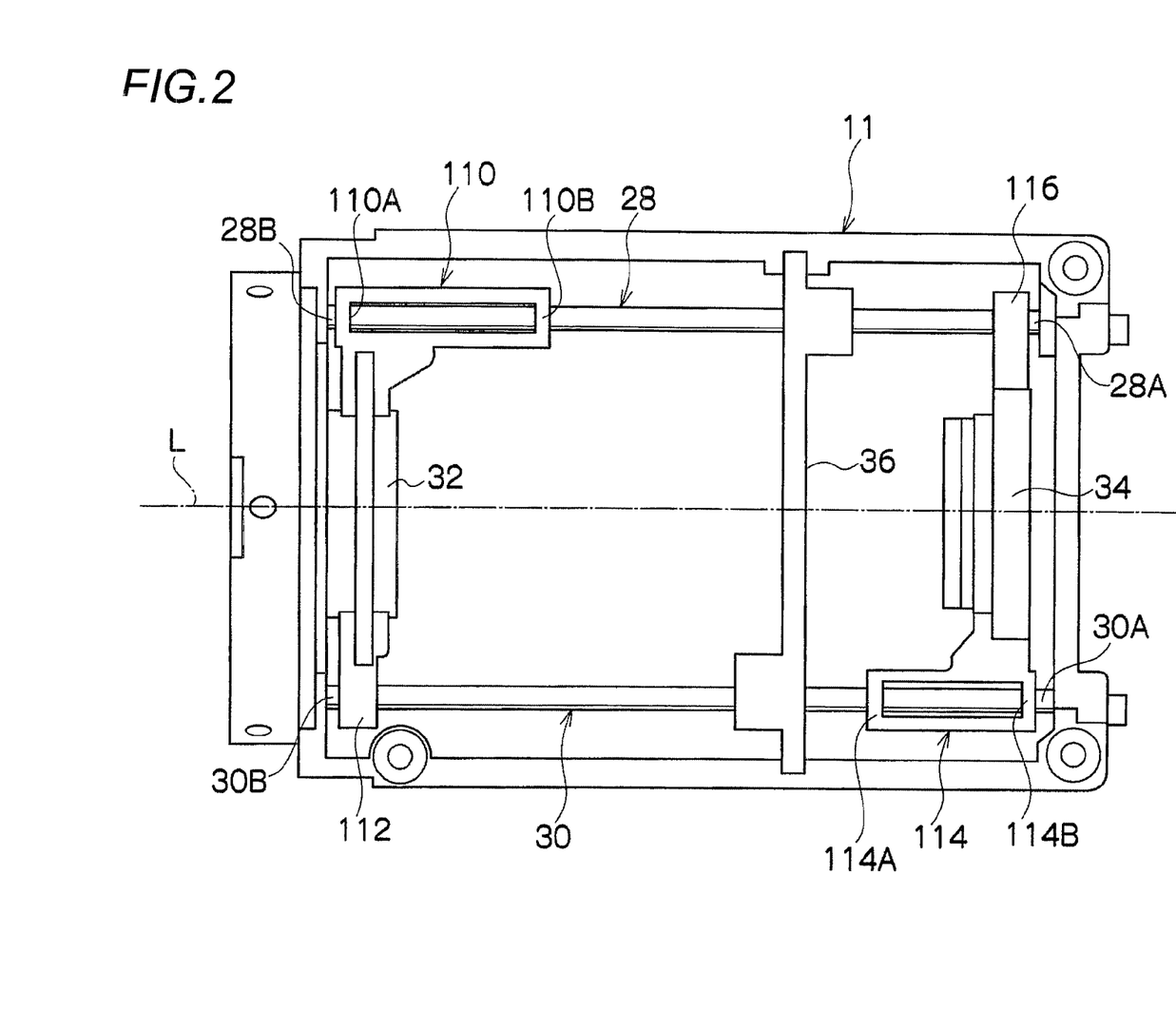
FIG. 2 is a plan view showing the lens device in a condition where components are incorporated in a lens barrel body.
Figure 3:
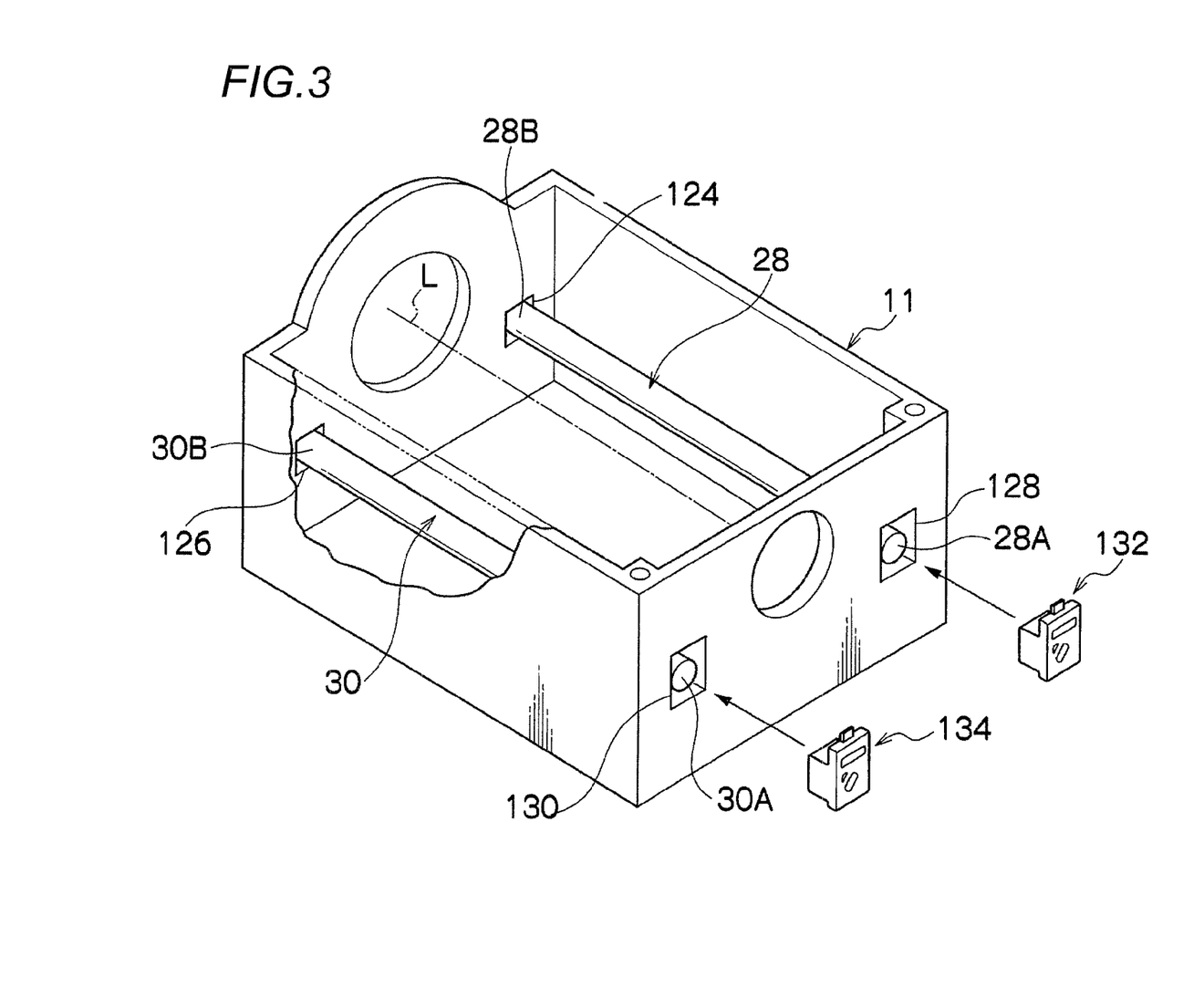
FIG. 3 is a perspective view showing a condition where guide bars are incorporated in the lens barrel body.

Next, the attachment mechanism for the guide bars 28 and 30 which are a feature of the present invention will be described. FIG. 2 is a plan view showing the lens device 10 in a condition where components are incorporated in the lens barrel body 11. FIG. 3 is a perspective view showing a condition where the guide bars 28 and 30 are incorporated in the lens barrel body 11. To show the feature of the present invention, FIG. 3 shows the configuration of the lens barrel body 11 in a simplified form.

As shown in these figures, in the lens barrel body 11, the two guide bars 28 and 30 are disposed parallel to the optical axis L. Moreover, in the lens barrel body 11, the holding frame 32 of the second lens unit 14 and the holding frame 34 of the fourth lens unit 18 are provided, and these holding frames 32 and 34 are fitted on the two guide bars 28 and 30.

On the holding frame 32, a guide portion 110 and a detent portion 112 are integrally formed. The guide portion 110 is elongated in the direction of the optical axis L, and has, at its ends 110A and 110B, guide holes (not shown) through which the guide bar 28 is inserted. These guide holes have substantially the same size as the guide bar 28, and the guide bar 28 is slidably inserted therethrough. Thereby, the guide portion 110, that is, the holding frame 32 is supported so as to be slidable along the guide bar 28. The guide portion 110 is elongated in the direction of the optical axis L since it is necessary to increase the distance between the ends 110A and 110B (that is, the guide holes) in the direction of the optical axis L in order to prevent clearance with the guide bar 28. On the other hand, on the detent portion 112, a groove (not shown) is formed from its outside (the lower side of FIG. 2). By the guide bar 30 being fitted in this groove, the holding frame 32 is prevented from rotating about the guide bar 28.

As on the holding frame 32, on the holding frame 34, a guide portion 114 and a detent portion 116 are integrally formed. The guide portion 114 is elongated in the direction of the optical axis L, and has, at its ends 114A and 114B, guide holes (not shown) through which the guide bar 30 is inserted. These guide holes have substantially the same size as the guide bar 30, and the guide bar 30 is slidably inserted therethrough. Thereby, the guide portion 114, that is, the holding frame 34 is supported so as to be slidable along the guide bar 30. The guide portion 114 is elongated in the direction of the optical axis L since it is necessary to increase the distance between the ends 114A and 114B (that is, the guide holes) in the direction of the optical axis L in order to prevent clearance with the guide bar 30. On the other hand, on the detent portion 116, a groove (not shown) is formed from its outside (the upper side of FIG. 2). By the guide bar 28 being fitted in this groove, the holding frame 34 is prevented from rotating about the guide bar 30.

As described above, on the guide bar 28, the guide portion 110 of the holding frame 32 is fitted, and the guide bar 28 acts as the main guide of the second lens unit 14. On the other hand, on the guide bar 30, the guide portion 114 of the holding frame 34 is fitted, and the guide bar 30 acts as the main guide of the fourth lens unit 18. For this reason, high parallelism with the optical axis L is required of the guide bars 28 and 30.

As shown in FIG. 3, one end 28B of the guide bar 28 is press-fitted in a hole (corresponding to the press fitting opening) 124 to be fixed. Then, the other end 28A thereof is loosely inserted in a hole (corresponding to the attachment hole) 128 of the lens barrel body 11, and then, is fixed to the lens barrel body 11 by a pressing member 132.

Likewise, one end 30B of the guide bar 30 is press-fitted in a hole (corresponding to the press fitting opening) 126 to be fixed. Then, the other end 30A thereof is loosely inserted in a hole (corresponding to the attachment hole) 130 of the lens barrel body 11, and then, is fixed to the lens barrel body 11 by a pressing member 134.

Figure 4:
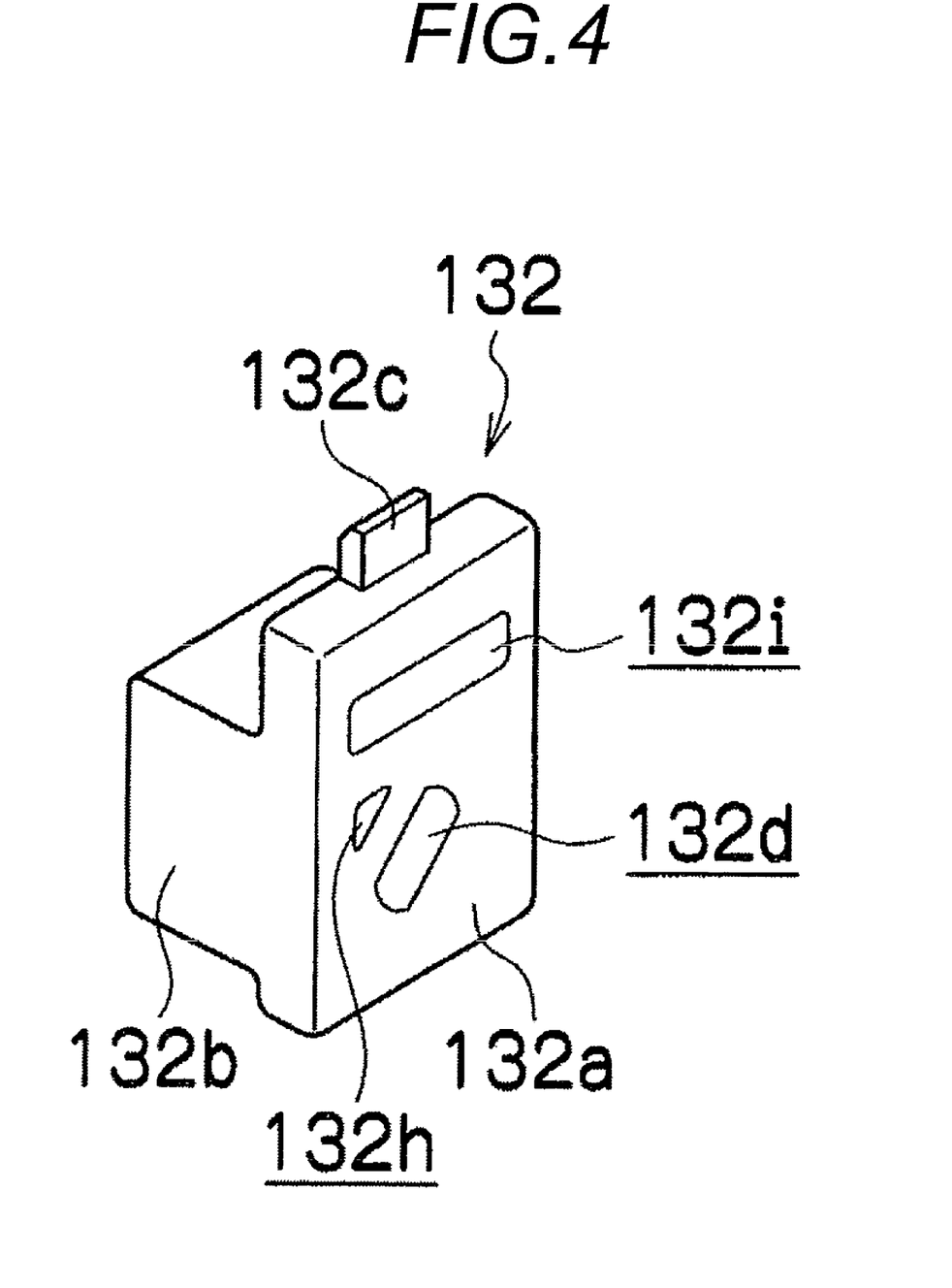
FIG. 4 is a perspective view showing a pressing member.
Figure 5A:
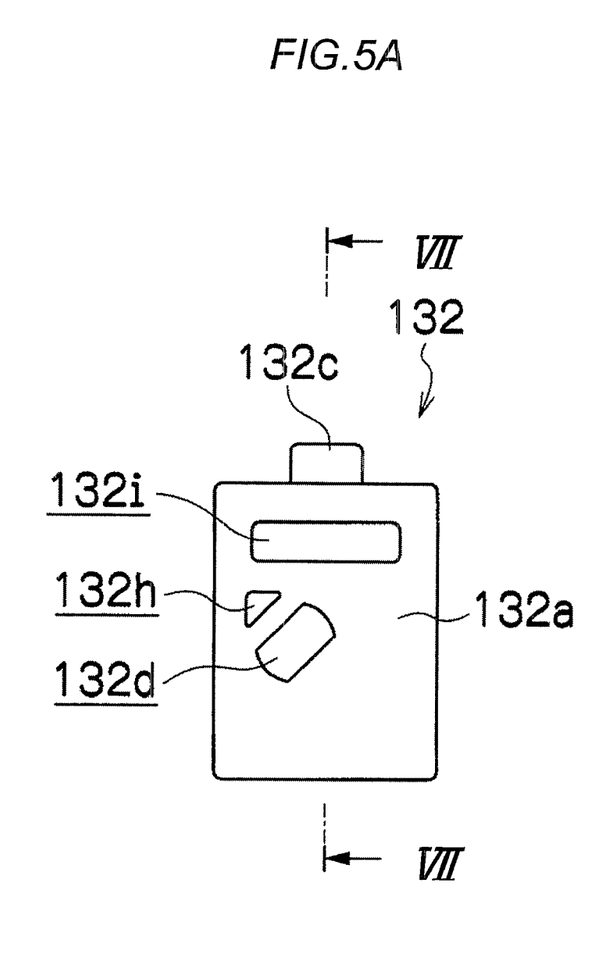
FIG. 5A is a front view of the pressing member.
Figure 5B:
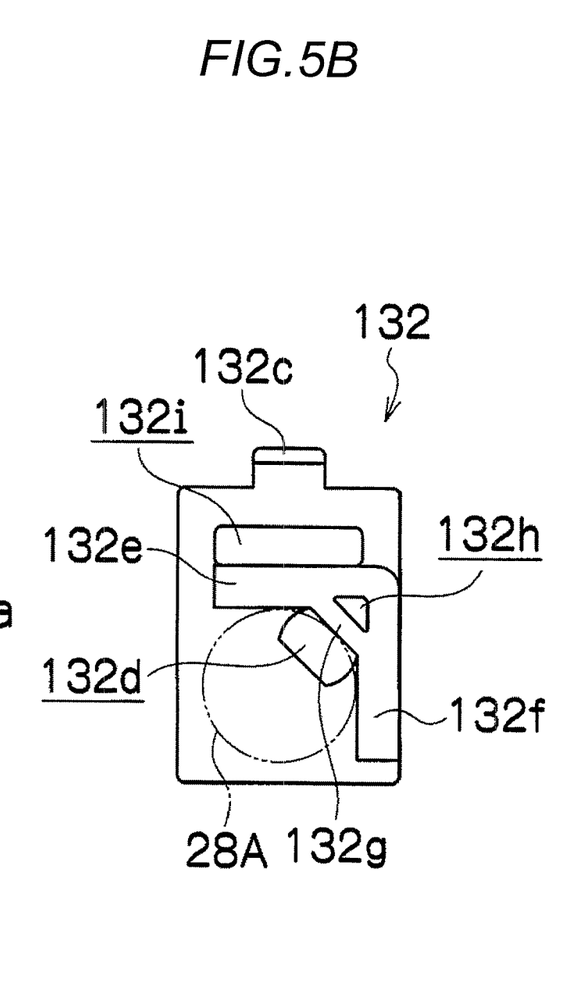
FIG. 5B is a rear view of the pressing member.
Figure 6:
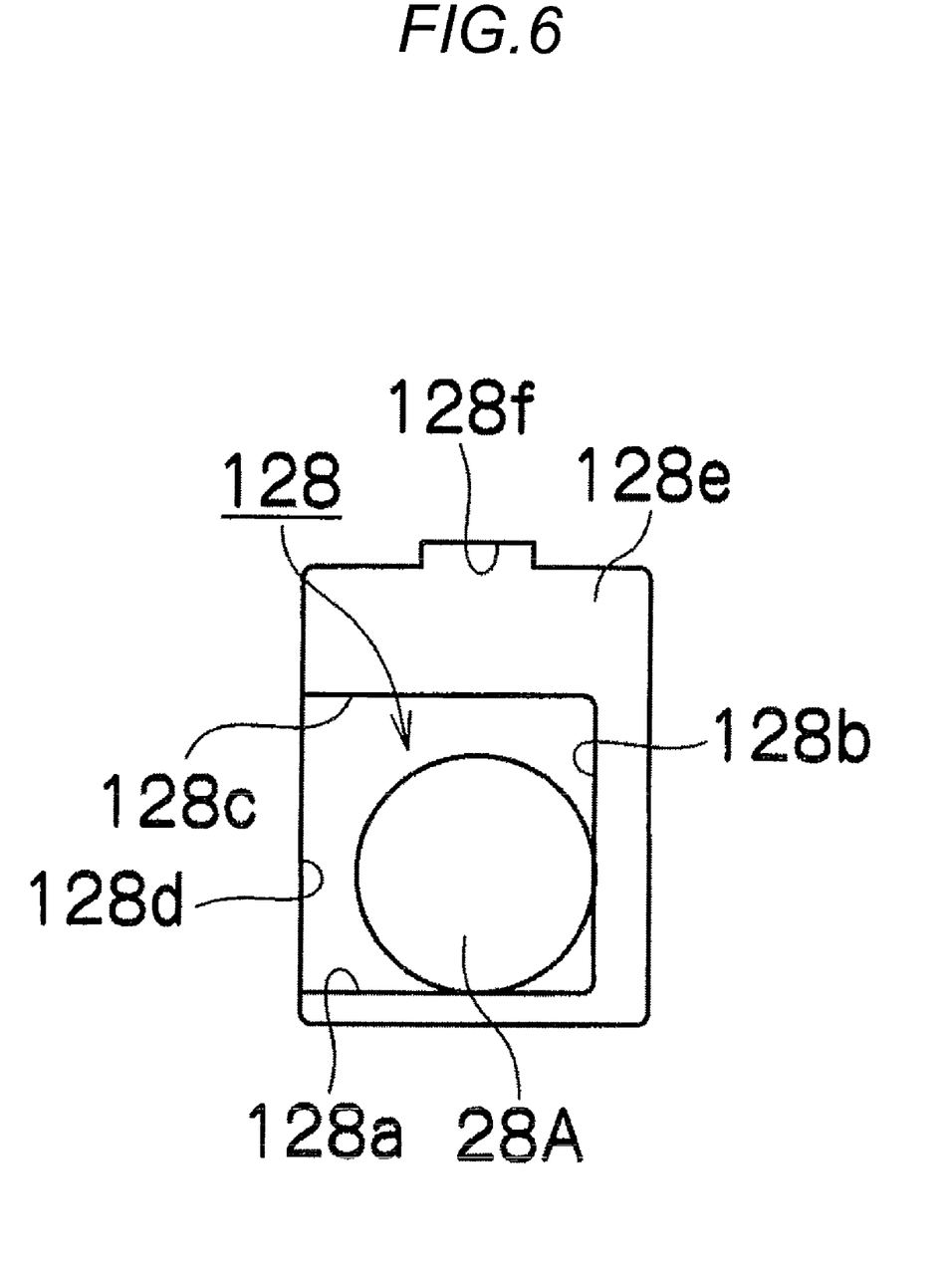
FIG. 6 is a front view showing an attachment hole.
Figure 7:
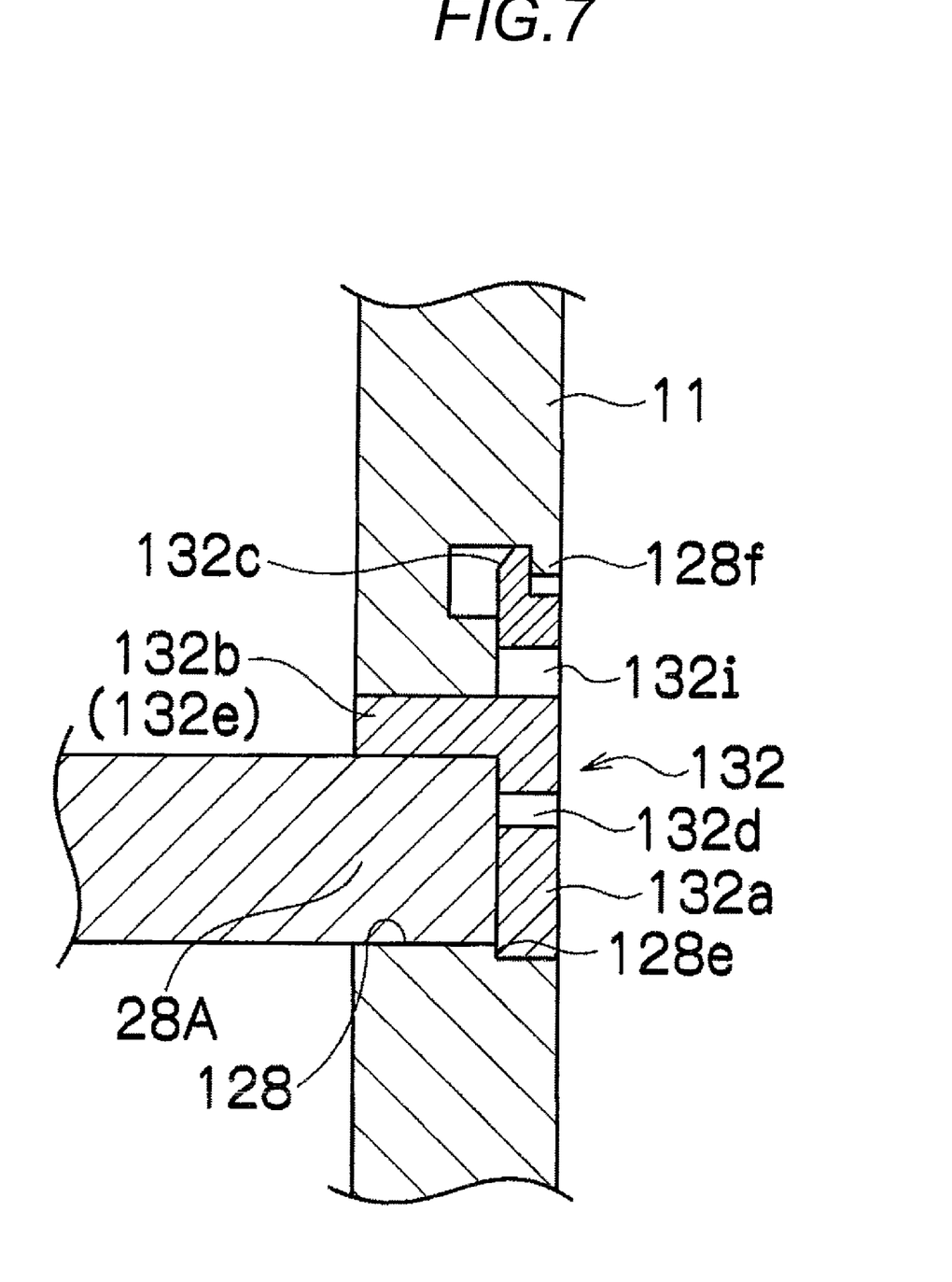
FIG. 7 is a cross-sectional view showing the fixation condition of a guide bar.

Next, a mechanism for fixing the end 28A of the guide bar 28 by the pressing member 132 will be described in detail. FIG. 4 is a perspective view showing the pressing member 132. FIG. 5A is a front view (from the outside) of the pressing member 132. FIG. 5B is a rear view (from the inside) of the pressing member 132. FIG. 6 is a front view (from the outside) of the hole 128. FIG. 7 is a cross-sectional view showing a condition where the pressing member 132 is fitted in the hole 128. FIG. 7 shows the cross section taken along the line VII-VII of FIG. 5A.

As shown in FIG. 6, the hole 128 of the lens barrel body 11 is a square hole formed in the direction of the optical axis L, and is larger than the end 28A of the guide bar 28. The guide bar 28 is inserted from the rear end of the lens barrel body 11 through the hole 128, and is set in the lens barrel body 11. Here, of the side surfaces forming the hole 128, the lower surface in FIG. 6 is denoted by 128a, the right side surface, by 128b, the upper surface, by 128c, and the left side surface, 128d. The guide bar 28 is inserted so as to abut on the lower surface 128a and the right side surface 128b with the lower surface 128a and the right side surface 128b as the reference surfaces. Consequently, clearance is formed on the upper and left sides of the guide bar 28.

The entrance of the hole 128 is a substantially rectangular concave larger than the hole 128. This forms a step 128e on the upper, right and lower sides of the hole 128. Further, an engagement portion 128f with which a later-described engagement protrusion 132c is engaged is formed on the upper side of the hole 128.

On the other hand, the pressing member 132 is constituted by a body 132a, a press fitting portion 132b and the engagement protrusion 132c which are integrally formed of a material with a strong elastic force such as polyacetal. The body 132a has the same substantially rectangular shape as the concave of the hole 128, and is fitted in the concave of the hole 128. In that case, the body 132a abuts on the step 128e, whereby the pressing member 132 is positioned in the direction of the optical axis L. A hollow portion 132d is formed substantially in the center of the body 132a, so that the guide bar 28 placed inside can be visually recognized through the hollow portion 132d.

The press fitting portion 132b is inserted in the clearance between the hole 128 and the guide bar 28, and as shown in FIG. 5B, is formed so as to protrude from the rear surface of the body 132a. The press fitting portion 132b is formed in a substantially triangular tube form by an upper side portion 132e, a side portion 132f and an oblique side portion 132g, and a triangular hollow portion 132h is formed among the upper side portion 132e, the side portion 132f and the oblique side portion 132g so that the oblique side portion 132g can be elastically deformed toward the triangular hollow portion 132h. Consequently, when the press fitting portion 132b is inserted in the clearance between the hole 128 and the guide bar 28, the guide bar 28 can be pressed by the oblique side portion 132g in the lower right direction of FIG. 6.

The engagement protrusion 132c is formed so as to protrude from the top of the body 132a, and a hollow portion 132i is formed in the body 132a near the engagement protrusion 132c. Consequently, the body 132a can be elastically deformed so that the engagement protrusion 132c enters the lower side. Thereby, the engagement protrusion 132c can be engaged with the engagement portion 128f of the lens barrel body 11 as shown in FIG. 7.

The pressing member 132 structured as described above is inserted in the hole 128 with the end 28A of the guide bar 28 situated in the lower right corner of the hole 128 as shown in FIG. 6. In that case, the press fitting portion 132b of the pressing member 132 is press-fitted in the upper left corner of the hole 128 (the clearance between the hole 128 and the guide bar 28), and the body 132a of the pressing member 132 is fitted in the concave of the hole 128. Then, when the body 132a of the pressing member 132 is pushed until it abuts on the step 128e of the hole 128, the engagement protrusion 132c of the pressing member 132 is engaged with the engagement portion 128f of the lens barrel body 11. Thereby, the end 28A of the guide bar 28 is fixed by being pressed against the lower right corner of the hole 128 (that is, the surfaces 128a and 128b of the hole 128) by the elastic force of the press fitting portion 132b of the pressing member 132. Moreover, since the engagement protrusion 132c is engaged with the engagement portion 128f, the pressing member 132 can be prevented from falling off to the outside. Further, since the body 132a of the pressing member 132 restricts the movement of the guide bar 28 in the axial direction, the guide bar 28 can be prevented from falling off through the hole 128.

The above is a description of the mechanism for fixing the end 28A of the guide bar 28, and a mechanism for fixing the end 30A of the guide bar 30 is structured similarly to the above-described mechanism for fixing the end 28A of the guide bar 28. That is, the hole 130 of the lens barrel body 11 is a square hole formed in the direction of the optical axis L, and is larger than the end 30A of the guide bar 30. The guide bar 30 is inserted from the rear end of the lens barrel body 11 through the hole 130, and is set in the lens barrel body 11. Moreover, the entrance of the hole 130 is a substantially rectangular concave larger than the hole 130. This forms a step (not shown) on the upper, right and lower sides of the hole 130. Further, an engagement portion (not shown) with which an engagement protrusion of the pressing member 134 is engaged is formed on the upper side of the hole 130.

The pressing member 134 will not be described because it is made of the same material and has the same configuration as the pressing member 132. The pressing member 132 and the pressing member 134 may be common parts. The pressing member 134 is inserted in the hole 130 with the end 30A of the guide bar 30 situated in the lower right corner of the hole 130. In that case, the press fitting portion of the pressing member 134 is press-fitted in the upper left corner of the hole 130 (the clearance between the hole 128 and the guide bar 28), the body of the pressing member 134 is fitted in the concave of the hole 130 to abut on the step of the hole 130, and the engagement protrusion of the pressing member 134 is engaged with the engagement portion of the lens barrel body 11. Thereby, the end 30A of the guide bar 30 is fixed by being pressed against the lower right corner of the hole 130 (that is, the right and lower surfaces of the hole 130) by the elastic force of the pressing member 134. Moreover, since the engagement protrusion of the pressing member 134 is engaged with the engagement portion of the lens barrel body 11, the pressing member 134 can be prevented from falling off to the outside. Further, since the body of the pressing member 134 restricts the movement of the guide bar 30 in the axial direction, the guide bar 30 can be prevented from falling off through the hole 130.

As described above, the end 28A of the guide bar 28 is fixed by being pressed against the lower right corner of FIG. 3 by the pressing member 132, and likewise, the end 30A of the guide bar 30 is fixed by being pressed against the lower right corner of the pressing member 134. Therefore, the end 28A of the guide bar 28 and the end 30A of the guide bar 30 are fixed by being pressed in the same direction.

By thus fixing the two guide bars 28 and 30 by pressing them in the same direction, the two guide bars 28 and 30 are always positioned with the same surfaces (the lower and right surfaces of FIG. 3) as the reference surfaces, so that the guide bar 28 and the guide bar 30 can be always fixed with high parallelism.

Figure 8:
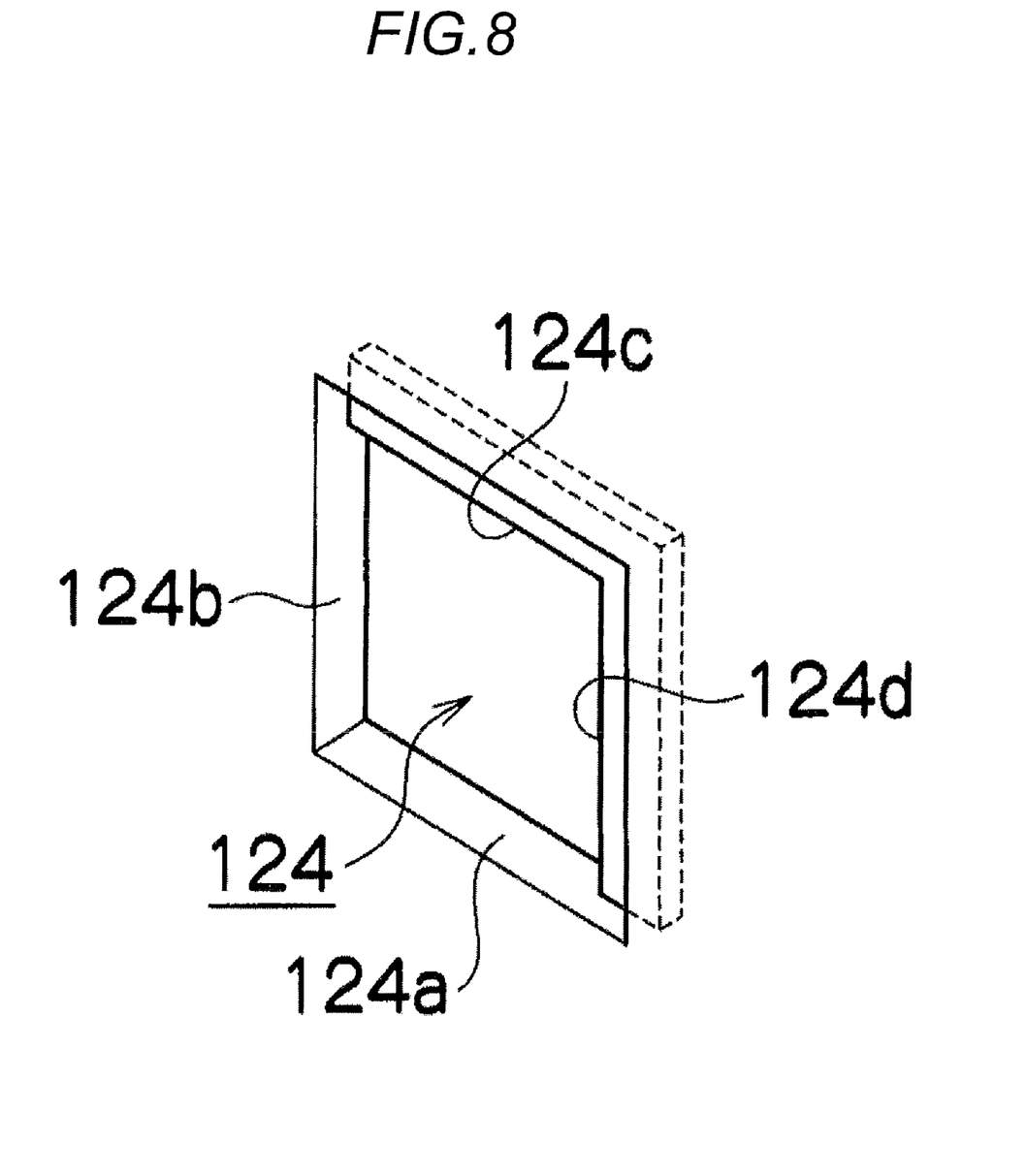
FIG. 8 is a perspective view, viewed from the front side, of a hole in which an end of the guide bar is press-fitted.
Figure 9A:
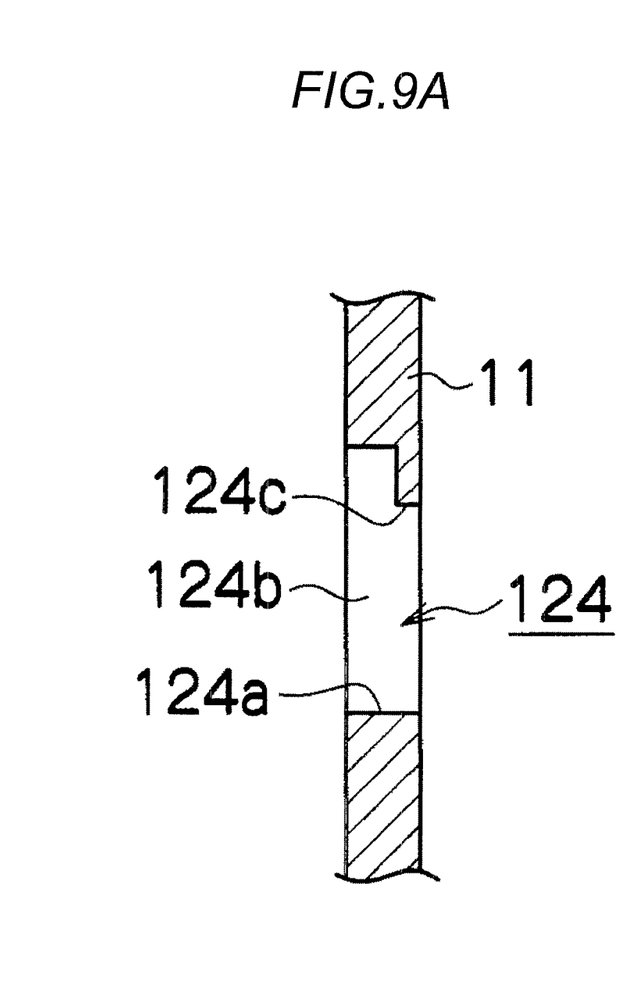
FIGS. 9A and 9B are explanatory views for explaining the press-fitted fixation condition of the guide bar.
Figure 9B:
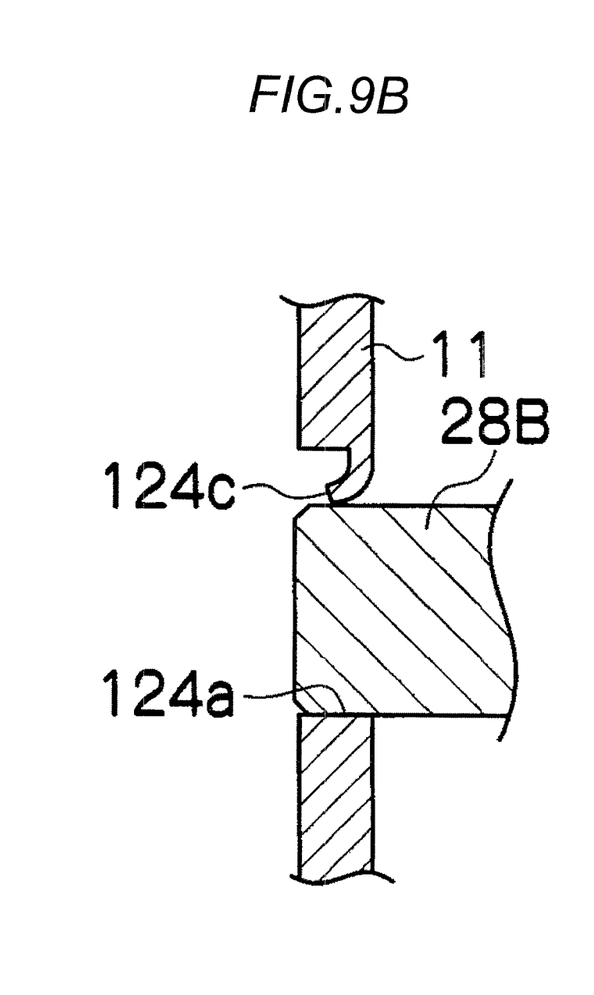

Next, a mechanism for fixing an end 28B of the guide bar 28 will be described. FIG. 8 is a perspective view, viewed from the front side, of the hole 124 in which the end 28B of the guide bar 28 is press-fitted. FIGS. 9A and 9B are longitudinal cross-sectional views for explaining the fixation condition of the end 28B of the guide bar 28.

The hole 124 of the lens barrel body 11 is a square hole formed in the direction of the optical axis L, and one side thereof is substantially as long as or slightly smaller than the diameter of the end 28B of the guide bar 28.

Here, of the four side surfaces forming the hole 124, the lower surface is denoted by 124a, the side surface situated on the left side in FIG. 8, by 124b, the upper surface, by 124c, and the side surface situated on the right side in FIG. 8, by 124d. The positional relation among the surface 124a, the surface 124b, the surface 124c and the surface 124d of the hole 124 correspond to that of the lower surface 128a, the right side surface 128b, the upper surface 128c and the left side surface 128d of the hole 128.

The hole 124 of FIG. 8 is processed with reference to the surfaces 124a and 124b. Specifically, the surfaces 124a and 124b of the hole 124 are processed so that their positions with respect to the optical axis L are the same as those of the surfaces 128a and 128b of the hole 128 of FIG. 6.

The side walls constituting the hole 124 are formed so that the sides of the surfaces 124a and 124b are thick and the sides of the surfaces 124c and 124d are thin. That is, the walls in the direction of the pressing by the above-described 132 are thick, and the walls opposite thereto are thin. Consequently, the side walls on the sides of the surfaces 124a and 124b of the hole 124 resist being deformed, and the side walls on the sides of the surfaces 124c and 124d are readily deformed. Therefore, when the end 28B of the guide bar 28 is press-fitted in the hole 124, the side walls on the sides of the surfaces 124c and 124d of the hole 124 are elastically deformed, and the end 28B of the guide bar 28 is fixed by being pressed against the surfaces 124a and 124b of the hole 124 by the elastic force. In that case, since the side walls of the surfaces 124a and 124b of the hole 124 are thick, the surfaces 124a and 124b of the hole 124 are never deformed. For example, as shown in FIGS. 9A and 9B, when the end 28B of the guide bar 28 is press-fitted in the hole 124, the side wall of the surface 124c is deformed to dissipate stress, whereas the side wall of the surface 124a is not deformed and the guide bar 28 is fixed while being positioned in the vertical direction with reference to the surface 124a. Likewise, the side wall of the surface 124d is deformed to dissipate stress, whereas the side wall of the surface 124b is not deformed and the guide bar 28 is fixed while being positioned in the horizontal direction with reference to the surface 124b.

By thus forming the side walls constituting the surfaces 124a and 124b of the hole 124 so as to be thicker than the side walls of the surfaces 124c and 124d, the end 28B of the guide bar 28 can be fixed with the surfaces 124a and 124b as the reference surfaces. Consequently, the ends 28A and 28B of the guide bar 28 are fixed with reference to the surfaces on the same side (that is, the surfaces 124a, 124b, 128a and 128b), so that the guide bar 28 can be fixed parallel to the optical axis L.

The above is a description of the mechanism for fixing the end 28B of the guide bar 28, and a mechanism for fixing the end 30B of the guide bar 30 is structured similarly to the above-described mechanism for fixing the end 28B of the guide bar 28. That is, the hole 126 of the lens barrel body 11 is a square hole formed in the direction of the optical axis L, and one side thereof is substantially as long as or slightly smaller than the diameter of the end 30B of the guide bar 30. The hole 126 is processed with reference to the lower and right surfaces (not shown) in FIG. 3. Specifically, the lower and right surfaces of the hole 126 are processed so that their positions with respect to the optical axis L are the same as those of the lower and right surfaces of the hole 130.

The side walls constituting the hole 126 are formed so that the side walls constituting the lower and right surfaces in FIG. 3 are thicker than the side walls constituting the upper and left surfaces. That is, the walls in the direction of the pressing by the above-described pressing member 134 are thick, and the walls opposite thereto are thin. Consequently, the hole 126 is formed so that the side walls constituting the lower and right surfaces resist being deformed and the side walls constituting the upper and left surfaces are readily deformed. Therefore, when the end 30B of the guide bar 30 is press-fitted in the hole 126, the side walls constituting the upper and left surfaces of the hole 126 are elastically deformed, and the end 30B of the guide bar 30 is fixed by being pressed against the lower and right surfaces of the hole 126 by the elastic force. In that case, since the side walls constituting the lower and right surfaces of the hole 126 are thick, the side walls constituting the lower and right surfaces of the hole 126 are never deformed. Therefore, the end 30B of the guide bar 30 can be fixed with the lower and right surfaces of the hole 126 as the reference surfaces. Consequently, the ends 30A and 30B of the guide bar 30 are fixed with reference to the surfaces on the same side, so that the guide bar 30 can be fixed parallel to the optical axis L.

As described above, according to the present exemplary embodiment, the end 28A of the guide bar 28 is fixed by being pressed against the lower and right surfaces (in FIG. 3) in the hole 128 by the pressing member 132, and likewise, the end 30A of the guide bar 30 is fixed by being pressed against the lower and right surfaces (in FIG. 3) in the hole 130 by the pressing member 134. Further, the end 28B of the guide bar 28 is fixed while being positioned with respect to the lower and right surfaces (in FIG. 3) in the hole 126, and likewise, the end 30B of the guide bar 30 is fixed while being positioned with respect to the lower and right sides (in FIG. 3) in the hole 128. Consequently, the two guide bars 28 and 30 are fixed with the ends 28A, 28B, 30A and 30B thereof being pressed in the same direction, so that the guide bar 28 and the guide bar 30 can be fixed parallel to each other and parallel to the optical axis L. Therefore, even when the guide bars 28 and 30 are selected parts, the guide bars 28 and 39 can be always fixed parallel to the optical axis L.

For example, there are cases where the guide bars 28 and 30 are changed to pins having slightly different outside diameters according to the accuracy when the guide holes of the guide portions 110 and 114 of the holding frames 32 and 34 are processed, and also in this case, since both ends of the guide bars 28 and 30 are fixed by being pressed by the same surfaces of the holes 128 and 130, the guide bars 28 and 30 can be fixed parallel to the optical axis L. Therefore, when the guide bars 28 and 30 are both main guides (for example, when the guide bar 28 is the main guide of the holding frame 32 and the guide bar 30 is the main guide of the holding frame 34 as in the present exemplary embodiment), high optical performance can be obtained.

Moreover, according to the present exemplary embodiment, since the two guide bars 28 and 30 can be both used as main guides, the guide portion 110 of the holding frame 32 and the guide portion 114 of the holding frame 34 can be disposed on the different guide bars 28 and 30. By thus disposing the guide portions 110 and 114 elongated in the direction of the optical axis L so as to be divided between the two guide bars 28 and 30, it is unnecessary to secure a large space for disposing the guide portions 110 and 114 in the direction of the optical axis L, so that the size of the lens device 10 can be reduced in the direction of the optical axis L.

Moreover, according to the present exemplary embodiment, since the holes 128 and 130 of the lens barrel body 11 are larger than the ends 28A and 30A of the guide bars 28 and 30, changes of the diameters of the guide bars 28 and 30 can be handled, and the guide bars 28 and 30 can be selected parts.

Further, according to the present exemplary embodiment, since the hollow portion 132h is formed in the pressing member 132 (or 134), the press fitting portion 132b can be readily elastically deformed according to the end 28A (or 30A) of the guide bar 28 (or 30), so that the end 28A (or 30A) of the guide bar 28 (or 30) can be reliably press-fitted by the press fitting portion 132b.

Moreover, according to the present exemplary embodiment, since the engagement protrusion 132c is formed on the pressing member 132 (or 134) and the engagement protrusion 132c is engaged with the engagement portion 128f of the lens barrel body 11, the pressing member 132 (or 134) can be prevented from falling off. Further, according to the present exemplary embodiment, since the guide bar 28 (or 30) can be prevented from moving in the axial direction by the body 132a of the pressing member 132 (or 134), the guide bar 28 (or 30) can be prevented from falling off in the axial direction.

Moreover, according to the present exemplary embodiment, since the hollow portion 132d is provided in the body 132a of the pressing member 132 (or 134), the fixation condition of the guide bar 28 (or 30) can be visually recognized through the hollow portion 132d.

While the ends 28A and 30A of the guide bars 28 and 30 are pressed in the lower right corners of FIG. 3 in the above-described exemplary embodiment, the pressing direction is not limited thereto, but they may be pressed in any direction. However, the guide bars 28 and 30 may be pressed in the same direction. Moreover, the ends 28B and 30B of the guide bars 28 and 30 may be pressed in the same direction as the ends 28A and 30A.

While the above exemplary embodiment is described with respect to the example in which the two guide bars 28 and 30 are provided, the present invention is also applicable to a case where three or more guide bars are provided. Also in this case, all the guide bars can be fixed with high parallelism by fixing them by pressing them in the same direction.

What is claimed is:

1. A lens device comprising:
    a lens barrel body that has a plurality of attachment holes;
    a plurality of guide bars that are supported by the lens barrel body and one ends of the plurality of guide bars are inserted in the plurality of attachment holes, respectively;

a plurality of lens holding frames that are supported so as to be movable along the plurality of guide bars and are engaged with the guide bars; and a plurality of pressing members that press the one ends of the guide bars in a direction perpendicular to the guide bars and are inserted in the attachment holes, wherein each of the plurality of the pressing members includes:

a wall surface that restricts a movement, in an axial direction, of the guide bars; and an engagement portion that is engaged with the lens barrel body to prevent the pressing member from falling off the lens barrel body, wherein the plurality of attachment holes are through-holes, and the wall surface is perpendicular to the axial direction of the guide bars.

2. The lens device according to claim 1, wherein the plurality of pressing members press the plurality of the guide bars in a same direction.

3. The lens device according to claim 1, wherein each of the pressing members is made of an elastic material, and has a hollow portion adjacent to the engagement portion.

4. The lens device according to claim 1, wherein the attachment holes are square holes, wherein the wall surface includes a substantially rectangular body that is fitted in the attachment hole, and the engagement portion protrudes from an outer surface of the rectangular body, and wherein the pressing members further include a press fitting portion that protrudes from the rectangular body in a substantially triangular tube shape and is press-fitted in a clearance between the attachment hole and the guide bar.

5. The lens device according to claim 1, wherein the plurality of the lens holding frames include first and second lens holding frames, wherein the first lens holding frame includes: a first guide portion that is engaged with a first guide bar so as to be slidable in a direction of an optical axis; and a detent portion that is engaged with a second guide bar to restrict a movement in a rotation direction of the first guide portion, and wherein the second lens holding frame includes the second portion which is engaged with the second guide bar.

6. The lens device according to claim 1, wherein the lens barrel body includes a press fitting opening for being press-fitted another end of the guide bar, and thicknesses of side surfaces of the press fitting opening to be pressed by the pressing member are larger than that of opposite sides of the side surfaces.

* * * * *